A. LEE.
Heating Stove.
No. 64,884. Patented May 21, 1867.
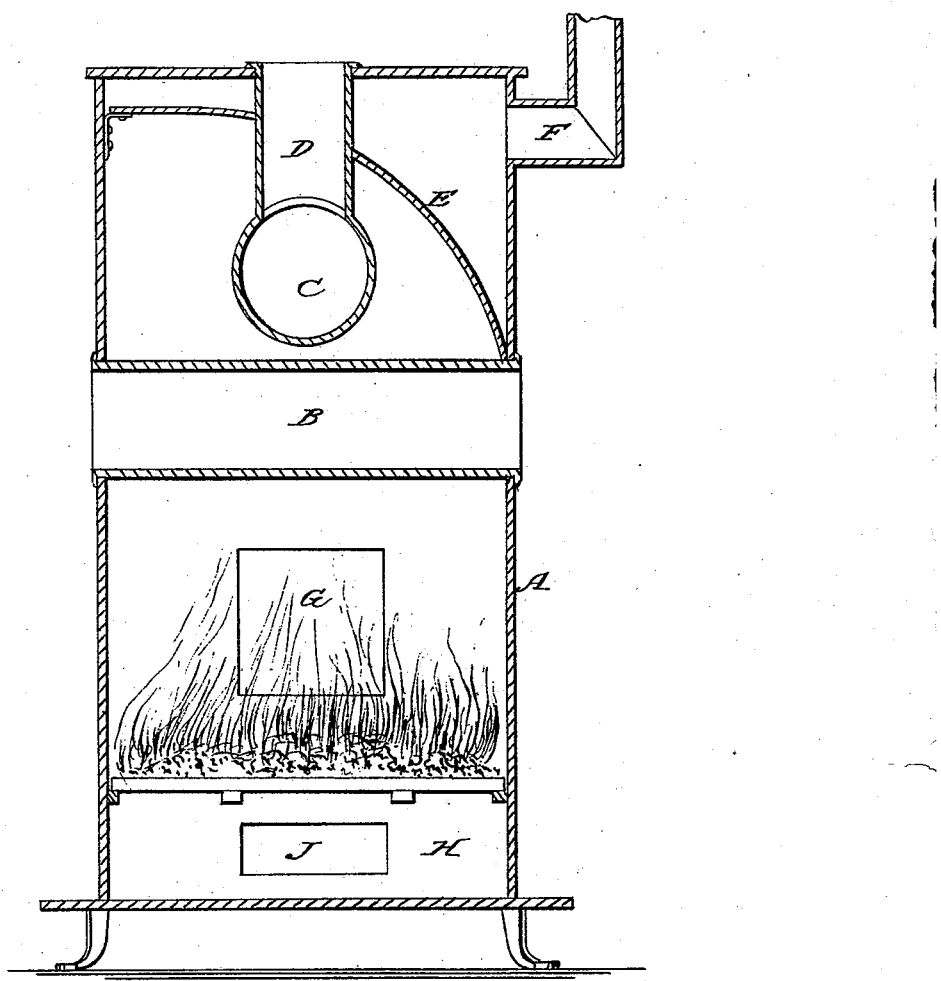

United States Patent Office.

A. LEE, OF ST. PAUL, MINNESOTA.

Letters Patent No. 64,884, dated May 21, 1867.

---

IMPROVEMENT IN HEATING-STOVES.

---

*The Schedule referred to in these Letters Patent and making part of the same.*

---

TO ALL WHOM IT MAY CONCERN:

Be it known that I, A. LEE, of St. Paul, in the county of Ramsey, and State of Minnesota, have invented a new and useful Improvement in Stoves; and I do hereby declare that the following is a full, clear, and exact description thereof, which will enable those skilled in the art to make and use the same, reference being had to the accompanying drawings, forming part of this specification.

This invention consists in an arrangement whereby the radiating surface of the stove is greatly increased and fuel economized, as I will proceed to describe.

The drawing represents a vertical section of my improved stove. Save in the addition which I have made, the stove itself does not materially differ from the ordinary heating-stoves in common use. Being aware that a large proportion of the heat generated from the fuel was not utilized, but passed off and was lost, and being also aware that air itself is a bad conductor of heat, and that the air in a room or building must be brought in contact with metallic or other heated surfaces to become sufficiently heated for warming purposes, I devised the plan substantially as shown in the drawing for increasing the heat-radiating surface, inducing thereby currents of air to pass through the stove and in contact with surfaces which are heated directly by the products of combustion in their passage to the chimney. The air thus heated rises and gives place to the colder air, so that a constant circulation is kept up.

A represents the stove. B is a hollow cylinder, which passes directly through the stove, and is open at both ends. C is another cylinder, of the same description, which, as represented in the drawing, is placed at right angles with B. The position of these air-cylinders may be varied, as well as the number of them. D is also a cylinder, which stands in a vertical position, open also at both ends, one end opening into C and the other passing up through the top of the stove. E represents a deflector, placed in the upper portion of the stove, substantially as shown in the drawing, through which the cylinder D passes. The heated gases and products of combustion are retarded in their upward course by the deflector and forced to part with their contained caloric before they enter the flue which conveys them to the chimney. The smoke and heated gases are thrown around the edge and upper portion of it, from whence they pass to the other side of the stove and enter the flue or pipe. F represents the pipe; G, the door or aperture for the introduction of the fuel. H is the ash-pit, and J is the ash-pit door.

What I claim as new, and desire to secure by Letters Patent, is—

I claim the deflector E, and the vertical cylinder D, in combination with the air-cylinders B and C, as and for the purposes specified.

A. LEE.

Witnesses:
Thos. R. Potts,
P. Heffernan.